United States Patent
Wu et al.

(10) Patent No.: US 12,386,447 B2
(45) Date of Patent: Aug. 12, 2025

(54) DISPLAY DEVICE INCLUDING DISPLAY LAYER, FUNCTIONAL LAYER AND ANTI-REFLECTION LAYER WHERE THE ANTI-REFLECTION LAYER IS DISPOSED OVER ANTENNA UNIT OF THE FUNCTIONAL LAYER

(71) Applicant: InnoLux Corporation, Miao-Li County (TW)

(72) Inventors: Yuan-Lin Wu, Miao-Li County (TW); Tsung-Han Tsai, Miao-Li County (TW); Kuan-Feng Lee, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/136,340

(22) Filed: Apr. 19, 2023

(65) Prior Publication Data

US 2023/0376134 A1    Nov. 23, 2023

(30) Foreign Application Priority Data

May 17, 2022   (CN) .......................... 202210541078.9

(51) Int. Cl.
*G06F 3/041* (2006.01)
*G02B 1/11* (2015.01)
*G02B 5/26* (2006.01)
*G06F 3/044* (2006.01)
*H01Q 1/24* (2006.01)

(52) U.S. Cl.
CPC .............. *G06F 3/0412* (2013.01); *G02B 1/11* (2013.01); *G02B 5/26* (2013.01); *G06F 3/0446* (2019.05); *H01Q 1/24* (2013.01); *G06F 2203/04112* (2013.01)

(58) Field of Classification Search
CPC ................. G06F 3/0412; G06F 3/0446; G06F 2203/04112; G02B 1/11; H01Q 1/24
See application file for complete search history.

(56) References Cited

U.S. PATENT DOCUMENTS

| | | | |
|---|---|---|---|
| 2018/0034130 A1* | 2/2018 | Jang | H01Q 1/2283 |
| 2020/0004365 A1* | 1/2020 | Shin | G06F 3/0443 |
| 2020/0257338 A1* | 8/2020 | Park | H04M 1/0268 |
| 2021/0132736 A1* | 5/2021 | Kim | H01Q 1/243 |
| 2021/0135340 A1 | 5/2021 | Kim | |
| 2021/0249755 A1* | 8/2021 | Kim | H01Q 1/14 |
| 2021/0313691 A1 | 10/2021 | Byun | |
| 2021/0318730 A1* | 10/2021 | Lee | H01Q 21/061 |
| 2021/0358996 A1* | 11/2021 | Lee | H10K 59/00 |
| 2022/0020823 A1* | 1/2022 | Kim | H10K 71/00 |
| 2022/0109227 A1* | 4/2022 | Lee | G06F 3/0446 |

(Continued)

FOREIGN PATENT DOCUMENTS

| | | | | |
|---|---|---|---|---|
| CN | 106550064 | * | 3/2017 | ............. H04M 1/02 |
| CN | 106550064 A | * | 3/2017 | ............. H04M 1/02 |
| CN | 114744427 A | * | 7/2022 | ............. H01R 12/01 |

*Primary Examiner* — Benjamin C Lee
*Assistant Examiner* — Nathan P Brittingham
(74) *Attorney, Agent, or Firm* — Winston Hsu (57) ABSTRACT

A display device includes a substrate, a display layer, a functional layer and an anti-reflection layer. The display layer is disposed over the substrate. The functional layer is disposed over the substrate and includes an antenna unit. The anti-reflection layer is disposed over the antenna unit.

18 Claims, 12 Drawing Sheets

(56) References Cited

U.S. PATENT DOCUMENTS

| | | | |
|---|---|---|---|
| 2022/0115767 A1* | 4/2022 | Lee | H10K 59/40 |
| 2022/0190045 A1* | 6/2022 | Lee | G06F 3/04164 |
| 2022/0261048 A1* | 8/2022 | Park | G06F 1/1626 |
| 2023/0050385 A1* | 2/2023 | Lee | G06F 3/0412 |

* cited by examiner

DISPLAY DEVICE INCLUDING DISPLAY LAYER, FUNCTIONAL LAYER AND ANTI-REFLECTION LAYER WHERE THE ANTI-REFLECTION LAYER IS DISPOSED OVER ANTENNA UNIT OF THE FUNCTIONAL LAYER

BACKGROUND OF THE DISCLOSURE

1. Field of the Disclosure

The disclosure is related to a display device including display layer, functional layer and anti-reflection layer, where the anti-reflection layer is disposed over antenna unit of the functional layer.

2. Description of the Prior Art

With the development of wireless communication applications, smart devices with antennas are widely used. For example, a smart phone should be equipped with an antenna to transceive wireless signals for users to use related services through the wireless network.

However, it is observed that the antenna on a handheld device is often covered by user's hand, thus resulting in a poor effect of transceiving signals. In addition, for high-speed applications such as 5G communications, the antenna's transceiving performance is often insufficient. Therefore, a solution is still in need to improve the performance of antenna.

SUMMARY OF THE DISCLOSURE

An embodiment provides a display device including a substrate, a display layer, a functional layer and an anti-reflection layer. The display layer is disposed on the substrate. The functional layer is disposed over the substrate and includes an antenna unit. The anti-reflection layer is disposed over the antenna unit.

These and other objectives of the present disclosure will no doubt become obvious to those of ordinary skill in the art after reading the following detailed description of the embodiment that is illustrated in the various figures and drawings.

DETAILED DESCRIPTION

In order to improve the driving capability of the circuit, FIG. 1 to FIG. 19 are used to illustrate the solutions provided by the embodiments. The architecture, number of components, number of layers, positions, distributions, ratios and so on in FIG. 1 to FIG. 19 are only examples to help explain and understand the embodiments, but not to limit the types and scopes of the embodiments. If the ordinal numbers such as first and second are mentioned in the text, they are only used to distinguish different components, not to limit the order or importance of the manufacturing process.

Throughout the disclosure and the appended claims, certain words are used to refer to specific elements. Those skilled in the art should understand that electronic device manufacturers may refer to the same components by different names. This article does not intend to distinguish those elements with the same function but different names. In the following description and claims, words such as "have" and "include" are open-ended words, so they should be interpreted as meaning "including but not limited to".

It should be understood that when an element or film layer is defined as being "on" or "connected to" another element or film layer, it can be directly on this another element or film layer or directly connected to the another element or layer; or it can be non-directly on this another element or film layer or non-directly connected to the another element or layer with another intervening element or film layer existing between the two element(s)/film layer(s). On the contrary, when an element is defined as being "directly on" or "directly connected to" another element or film layer, there is no intervening element or film layer between the two element(s)/film layer(s).

The term "approximate", "equal", "identical" or "substantially the same" usually means a range within 20% of a given value or range, or means a range within 10%, 5%, 3%, 2%, 1% or 0.5% of a given value or range.

In addition, the term "within the range from the first value to the second value" means that the range includes the first value, the second value, and other values in between.

Although terms such as first, second, third and so on can be used to describe different assembling elements, but these assembling elements are not limited by these terms. These terms are only used to distinguish an assembling element from another assembling element in the specification. In the claims, it is not limited to use the same terms, and the terms such as first, second, and third can be used to indicate the order of defining the elements. Therefore, in the following description, the first assembling element may be corresponding to the second assembling element in the claims.

It should be understood that the technical features of several different embodiments can be replaced, reorganized, and mixed to complete other embodiments without conflic- tion or departing from the spirit of the disclosure.

In the present disclosure, an electronic device may include a display device, a backlight device, an antenna device, a sensing device or a splicing device, but is not limited thereto. An electronic device can be a bendable or flexible electronic device. A display device can be a non-self-luminous display device or a self-luminous display device. An antenna device can be a liquid crystal type antenna device or a non-liquid crystal type antenna device, and the sensing device can be a sensing device for sensing capacitance, light, thermal energy or ultrasonic waves, but is not limited thereto. An electronic component may include passive component and active component, such as capacitor, resistor, inductor, diode, transistor, and the like. A diode may include light emitting diode or photodiode. A light emitting diode may, for example, include organic light emitting diode (organic light emitting diodes, OLED), submillimeter light emitting diode (mini LED), micro light emitting diode (micro LED) or quantum dot light emitting diode (quantum dot LED), but is not limited thereto. A splicing device may be, for example, a display splicing device or an antenna splicing device, but is not limited thereto. It should be noted that an electronic device can be any combination of the aforementioned elements, but is not limited thereto. In the following, a display device is used as an electronic device or a splicing device to describe the content of the disclosure, but the disclosure is not limited thereto. The sectional views and top views shown herein are schematic diagrams to help understand the present disclosure, and do not include all details. In the text, when two elements are described to be overlapped with one another, the two elements may or may not be in contact with one another.

Figure 1:
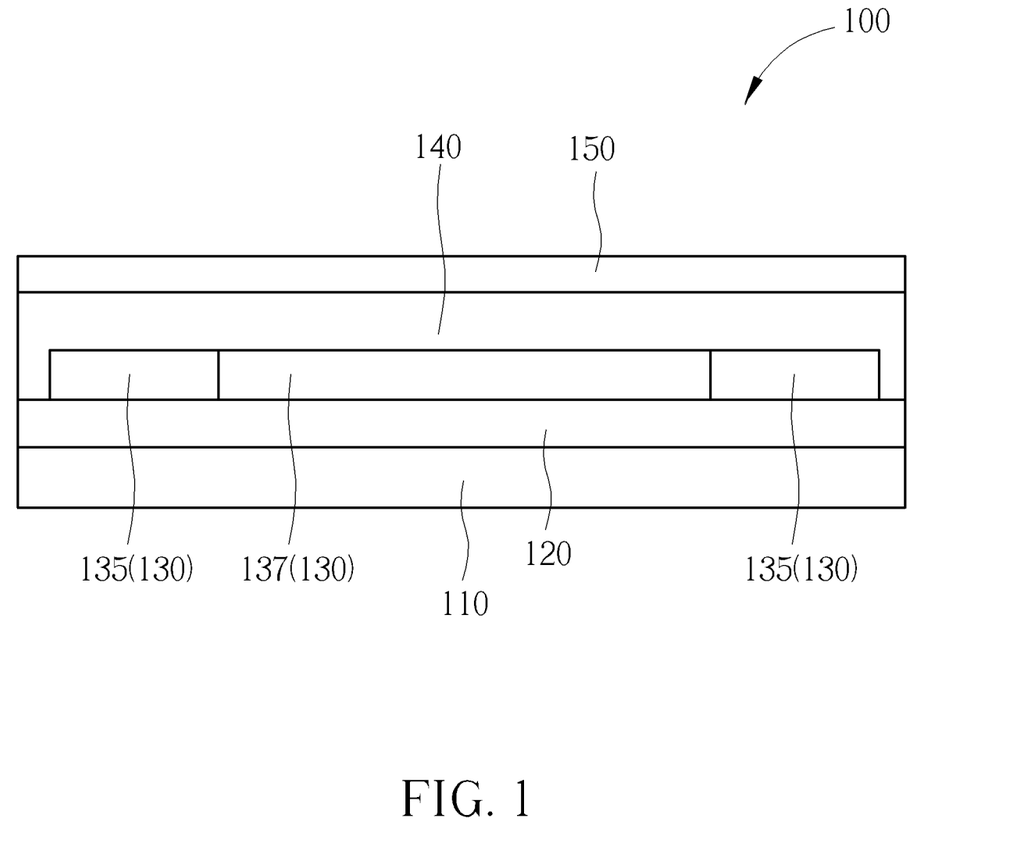
FIG. 1 illustrates a sectional view of the display device according to an embodiment.

FIG. 1 illustrates a sectional view of the display device 100 according to an embodiment. The display device 100 can include a substrate 110, a display layer 120, a functional layer 130 and an anti-reflection layer 140. The display layer 120 can be disposed on the substrate 110. The functional layer 130 can be disposed over the substrate 110 and include at least one antenna unit 135. The anti-reflection layer 140 can be disposed over the antenna unit 135. In addition to covering the antenna unit 135, the anti-reflection layer 140 can also extend to cover the display layer 120. As shown in FIG. 1, the functional layer 130 can further include a plurality of sensing units 137 which will be described below. The display device 100 can further include a protection layer 150 used to protect components and layers in the display device 100.

The substrate 110 can be a hard substrate or a flexible substrate, such as made of glass, sapphire, wafer, plastic and other materials. The display layer 120 can include a circuit layer, and a light emitting element and/or a pixel electrode electrically connected to the circuit layer. The functional layer 130 can be capable of performing non-display functions, and the non-display functions can include touch control, biological therapy, biometric identification, or antenna transmission and reception. When the display device 100 displays images, the anti-reflection layer 140 can prevent a decrease in contrast caused by the reflection of ambient light when the ambient light hits the metal part of the antenna (e.g. a metal wire). The functional layer 130 can be disposed on the display layer 120 as shown in FIG. 1. However, FIG. 1 is an example. In other embodiments, the display layer 120 can be disposed over the functional layer 130, or the display layer 120 and the functional layer 130 can be made of the same layer.

The anti-reflection layer 140 in FIG. 1 can include a circular-polarizer layer. The circular-polarizer layer of the anti-reflection layer 140 can include a linear polarizer plate or a quarter-wave plate.

The anti-reflection layer 140 can include a color filter layer. The color filter units of the color filter layer (e.g. red, green and blue color filter units) can transmit the light emitted from the display layer 120 to display light with colors or improve color purity. The light shielding layer of the color filter layer (e.g. black matrix layer) can be used to shield reflected light. In addition, a plurality of layers of color filter units of different colors can be stacked to block reflected light. The structure and function of the color filter layer will be described below. The color filter units can be generated using an ink-jet process, so the surface may have a curvature.

The anti-reflection layer 140 can include both a circular-polarizer layer and a color filter layer. For applications with higher anti-reflection requirements (e.g. vehicle devices), the anti-reflection layer 140 with this structure can be used to improve the anti-reflection effect.

Figure 2:
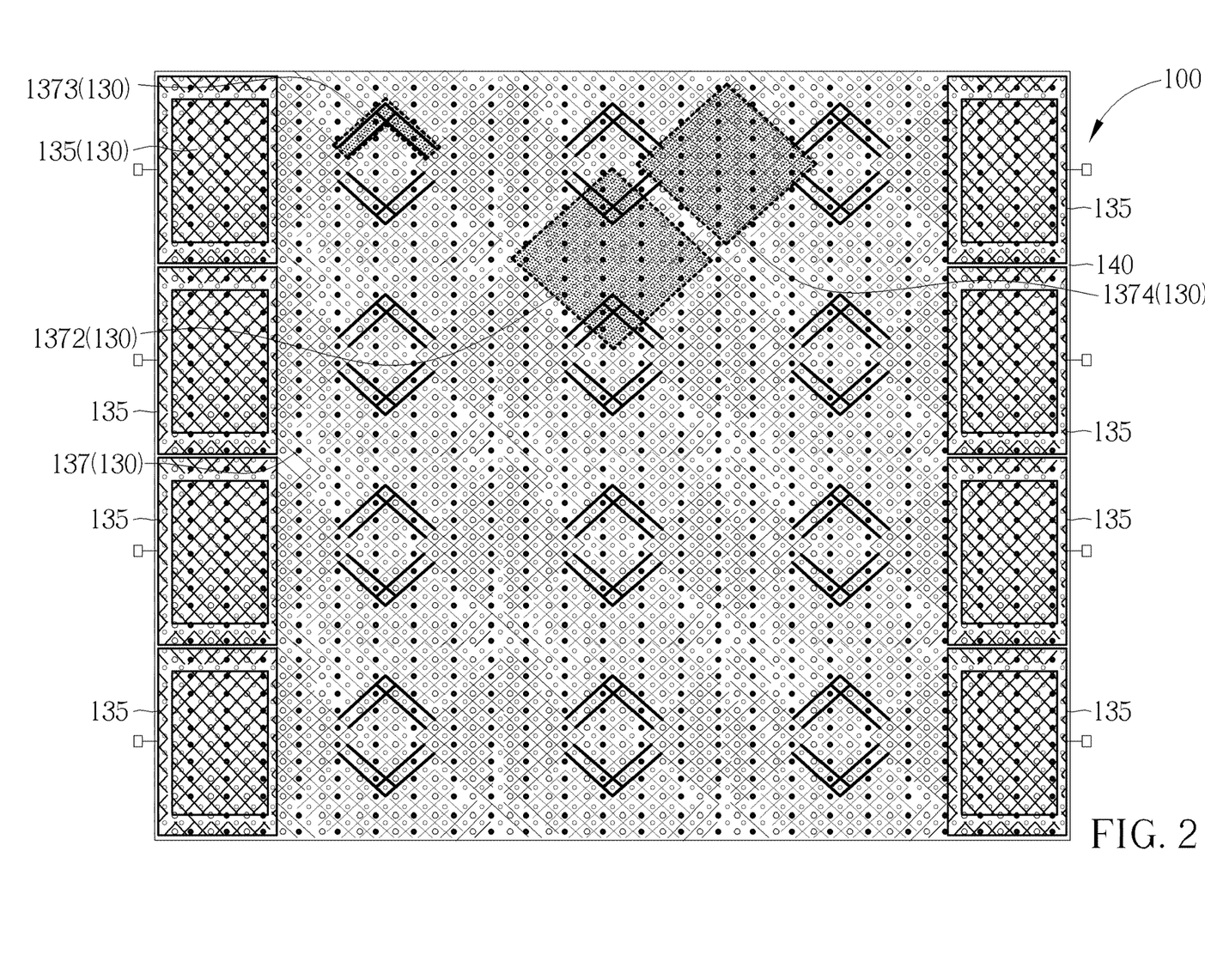
FIG. 2 illustrates a top view of the display device in FIG. 1.

FIG. 2 illustrates a top view of the display device 100 in FIG. 1. The antenna units 135 and the sensing units 137 can have mesh structures which can be the mesh electrodes mentioned below. Each antenna unit 135 of the functional layer 130 can have a first mesh electrode. Each sensing unit 137 of the functional layer 130 can have a second electrode. More details will be described below.

The light emitted from the display layer 120 can pass through holes of the mesh structures of the antenna units 135 and the sensing units 137. The display device 100 can include a plurality of antenna units 135, and different antenna units 135 can receive wireless signals of different frequencies or different frequency bands.

In the sensing units 137 of the display device 100, for example, a plurality of reception units 1374 can be disposed in a horizontal row, and a plurality of transmission units 1372 can be disposed in a vertical column. The transmission units 1372 in the same column can be electrically connected. The reception units 1374 in the same row can be electrically connected through a plurality of bridge units 1373. Hence, an array structure formed with a plurality of sensing units 137 can be implemented.

In FIG. 2, the antenna units 135 can be arranged on two sides of the display device 100. However, FIG. 2 is an example, and embodiments are not limited thereto. In another embodiment, antenna units with mesh structures can be arranged in all areas of the display layer 120 for improving the transceiving performance of the antennas. For example, this structure can be used for high frequency applications such as 5G communications. With this structure, the light generated by the display layer 120 can pass through the holes of the mesh structures of the antenna units 135 and the sensing units 137 to be emitted outward.

Figure 3:
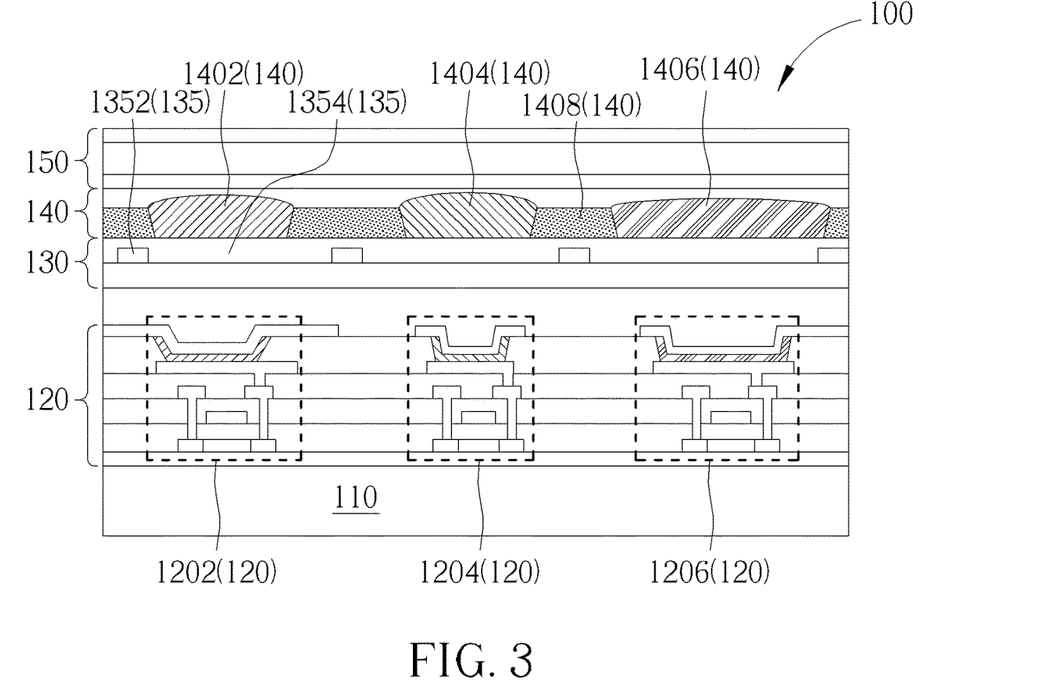
FIG. 3 illustrates a sectional view of the antenna device in FIG. 1.

FIG. 3 illustrates a sectional view of the antenna device 100 in FIG. 1. The display layer 120 can include light emitting unit 1202, light emitting unit 1204 and light emitting unit 1206. For example, the light emitting unit 1202, the light emitting unit 1204 and the light emitting unit 1206 can emit red light, green light and blue light respectively. Each of the light emitting unit 1202, the light emitting unit 1204 and the light emitting unit 1206 can include a light emitting diode or light emitting transistor mentioned above.

As shown in FIG. 3, the antenna unit 135 can include a plurality of openings 1354 and at least one first mesh electrode 1352 adjacent to the openings 1354. The first mesh electrode 1352 in FIG. 3 is a sectional view of the mesh electrode shown in the top view.

The anti-reflection layer 140 in FIG. 3 can include a color filter layer, and the color filter layer can include a light shielding layer 1408 and a plurality of color filter units such as color filter unit 1402, color filter unit 1404 and color filter unit 1406. The light shielding layer 1408 can be adjacent to the color filter unit 1402, the color filter unit 1404 and the color filter unit 1406. For example, the color filter unit 1402, the color filter unit 1404, and the color filter unit 1406 can respectively have materials that allow red light, green light, and blue light to pass through, so that visible light is displayed or the color purity of light is improved. The light shielding layer 1408 can be black to shield reflected ambient light.

In FIG. 3, the first mesh electrode 135 can be overlapped with the light shielding layer 1408, and the plurality of color filter units (e.g. the color filter unit 1402, the color filter unit 1404 and the color filter unit 1406) can be overlapped with the plurality of openings 1354. In FIG. 3, the light shielding layer 1408 can shield ambient light from hitting to the first mesh electrode 1352 of the antenna unit 135, so as to provide anti-reflection effect. The light emitted by the display layer 120 can pass through the openings 1354 without being blocked. According to embodiments, the first mesh electrodes 1352 of the antenna units 135 can be overlapped with the light shielding layer 1408 in the top view of the antenna device 100.

Figure 4:
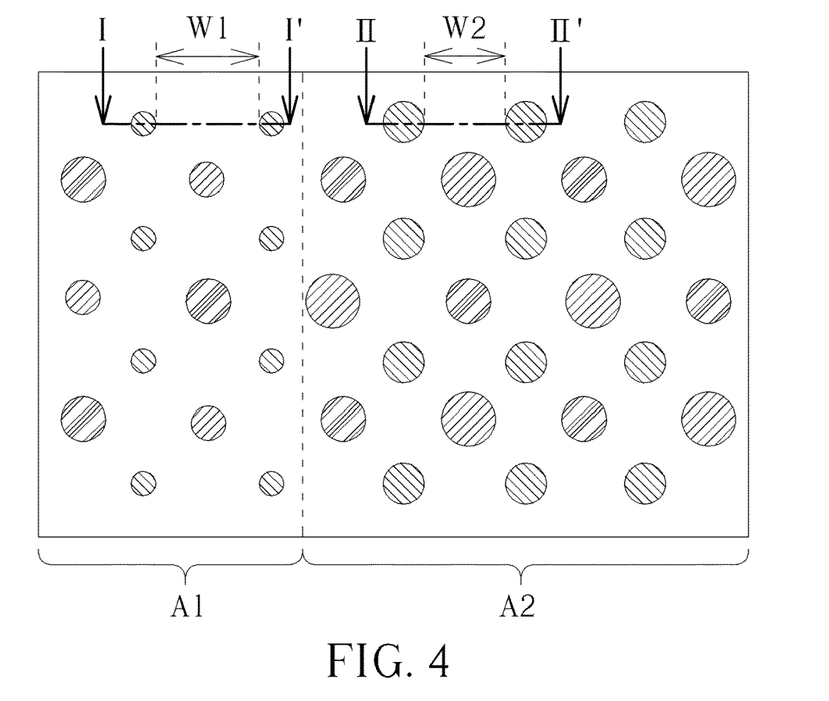
FIG. 4 illustrates a top view of a part of the display device in FIG. 1.
Figure 5:
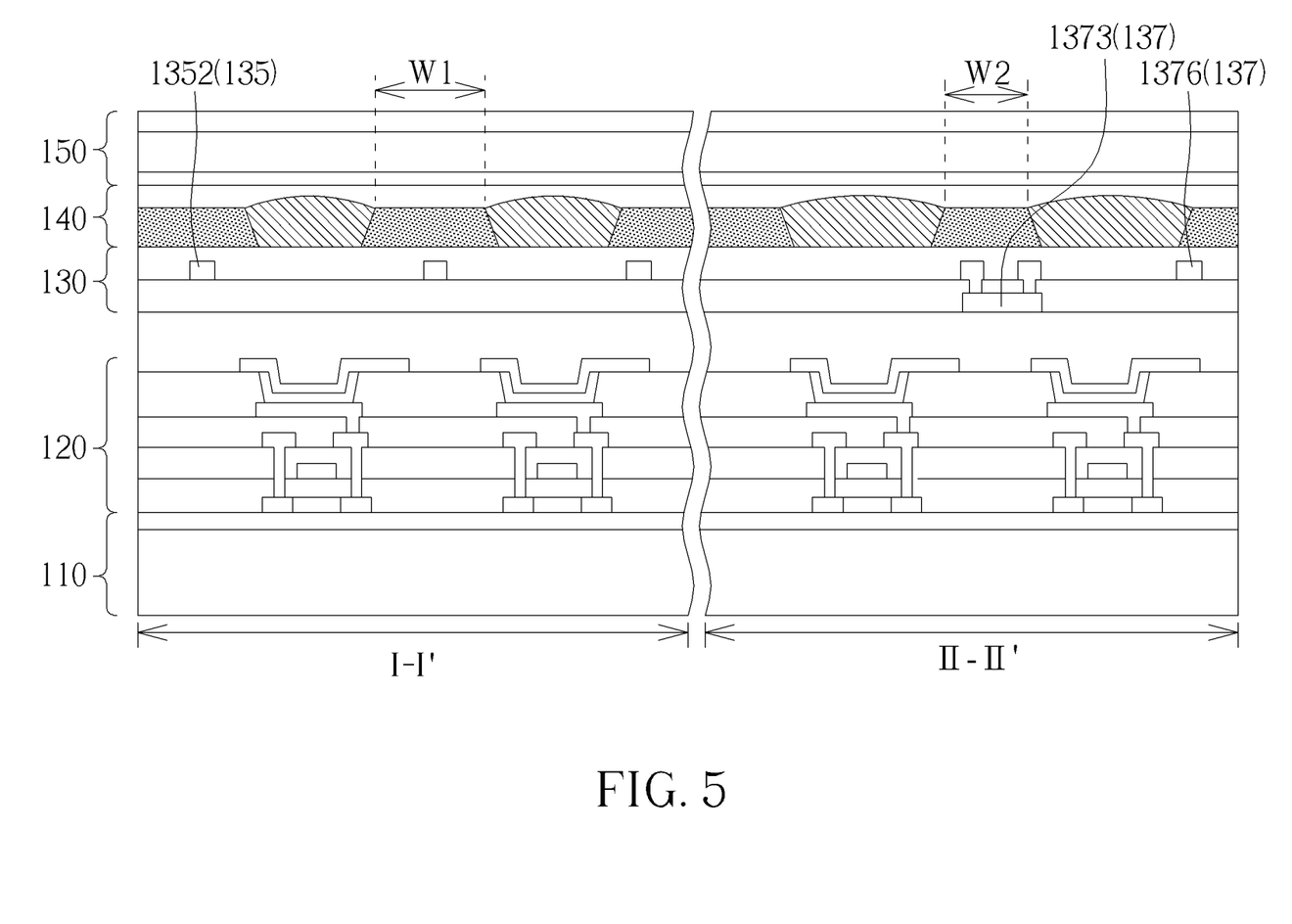
FIG. 5 illustrates a sectional view along the section lines in FIG. 4.

FIG. 4 illustrates a top view of a part of the display device 100 in FIG. 1. FIG. 5 illustrates a sectional view along the section line I-I' and the section line II-IT in FIG. 4. The section line I-I' and the section line II-IF can be obtained when measuring the light shielding layer 1408 along two adjacent light emitting components. In FIG. 4 and FIG. 5, the antenna units 135 can be in an area A1, and the sensing units 137 can be in an area A2. In FIG. 5, the functional layer 130 can include a plurality of sensing units 137 each having a second mesh electrode 1376. The second mesh electrode 1376 in FIG. 5 is a sectional view of the mesh electrode shown in the top view. The first mesh electrode 1352 of the antenna unit 135 can be overlapped with a first part of the light shielding layer 1408, the second mesh electrode 1376 of the sensing unit 137 can be overlapped with a second part of the light shielding layer 1408, and a width W1 of the first part can be greater than a width W2 of the second part. According to embodiments, the widths of the first part and the second part can be measured along the same direction in the top view of the display device 100, or the widths of the first part and the second part can be measured on a top of a sectional view. Since the widths of conductive wires of the first mesh electrode 1352 of the antenna unit 135 and the second mesh electrode 1376 of the sensing unit 137 can be different, the width W1 and the width W2 corresponding to the light shielding layer 1408 of the anti-reflection layer 140 can be designed to be different to have an even anti-reflection effect in both areas.

According to the example in FIG. 5, the antenna unit 135 and the sensing units 137 of the functional layer 130 can be made of the same layer. In other words, a same metal layer or a same set of metal layers can be patterned to form the antenna unit 135 and the sensing units 137, so the antenna unit 135 and the sensing units 137 can be of the same plane. As a result, the number of used photo masks and other costs are reduced.

In other embodiments, the antenna unit 135 and the sensing units 137 of the functional layer 130 can be made of different layers. In other words, different metal layers can be patterned to form the antenna unit 135 and the sensing units 137, so the antenna unit 135 and the sensing units 137 can be of different planes. In this way, the antenna unit 135 and the sensing units 137 may be overlapped with one another to increase the flexibility of layout.

Figure 6:
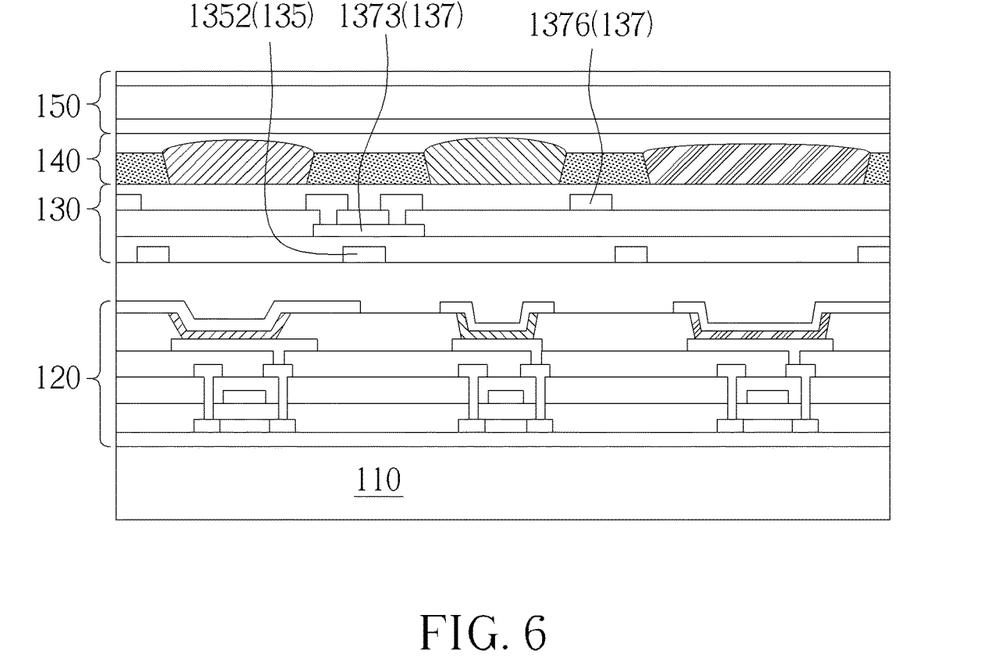
FIG. 6 illustrates a sectional view of the antenna device according to another embodiment.

FIG. 6 illustrates a sectional view of the antenna device 100 according to another embodiment. The similarities in FIG. 6 and FIG. 3 are not repeatedly described. In FIG. 6, the antenna unit 135 and the sensing units 137 can be made of different layers, and the sensing units 137 can be disposed between the anti-reflection layer 140 and the antenna unit 135.

Figure 7:
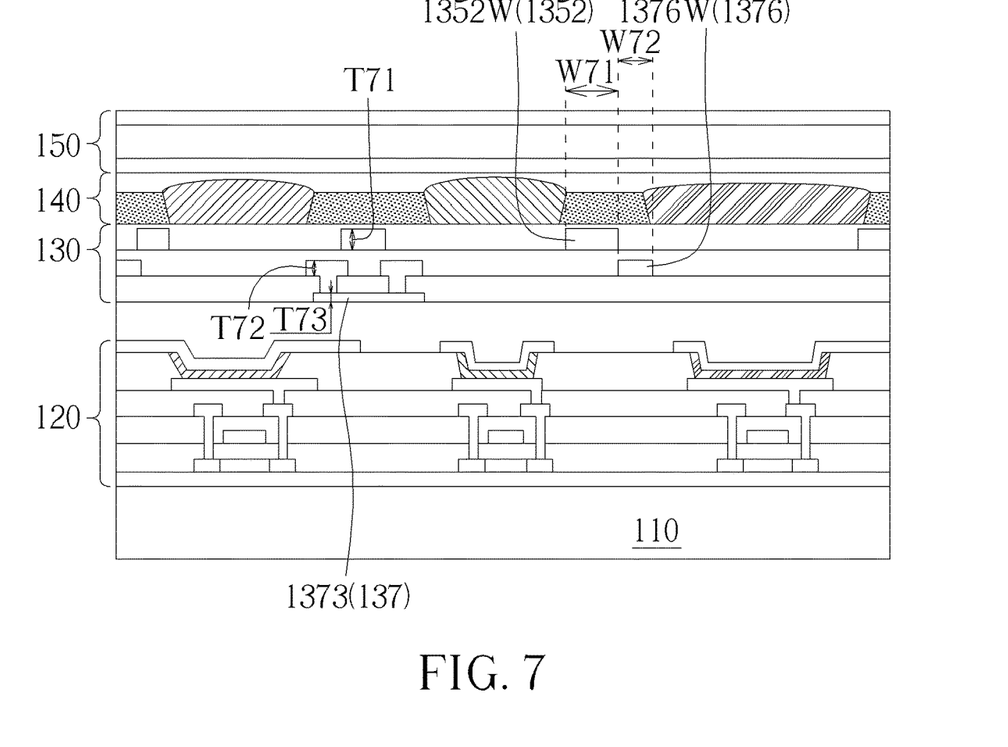
FIG. 7 illustrates a sectional view of the antenna device according to another embodiment.

FIG. 7 illustrates a sectional view of the antenna device 100 according to another embodiment. The similarities in FIG. 7 and FIG. 3 are not repeatedly described. In FIG. 7, the antenna unit 135 and the sensing units 137 of the functional layer 130 can be made of different layers, and the antenna unit 135 can be disposed between the anti-reflection layer 140 and the sensing units 137.

In FIG. 7, the first mesh electrode 1352 can include a plurality of first wire segments 1352W. The second mesh electrode 1376 can include a plurality of second wire segments 1376W. A width W71 of one of the first wire segments 1352W can be greater than a width W72 of one of the second wire segments 1376W, and it can be expressed as W71>W72. The widths of two different wire segments can be measured in the same SEM (scanning electron microscope) image of the same section. In FIG. 7, a thickness T71 of the first mesh electrode 1352 can be greater than a thickness T72 of the second mesh electrode 1376, the thickness T72 of the second mesh electrode 1376 can be greater than a thickness T73 of the bridge unit 1373, and it can be expressed as T71>T72>T73.

Regarding the relationship between the widths of the first mesh electrode 1352 and the second mesh electrode 1376 and the relationship among the thicknesses of the first mesh electrode 1352, the second mesh electrode 1376 and the bridge unit 1373, FIG. 7 is an example, and embodiments are not limited thereto. When the first mesh electrode 1352 is below the second mesh electrode 1376, or when the first mesh electrode 1352 and the second mesh electrode 1376 are of the same plane, the relationships among the widths and the thicknesses of the components can be as described above.

Figure 8:
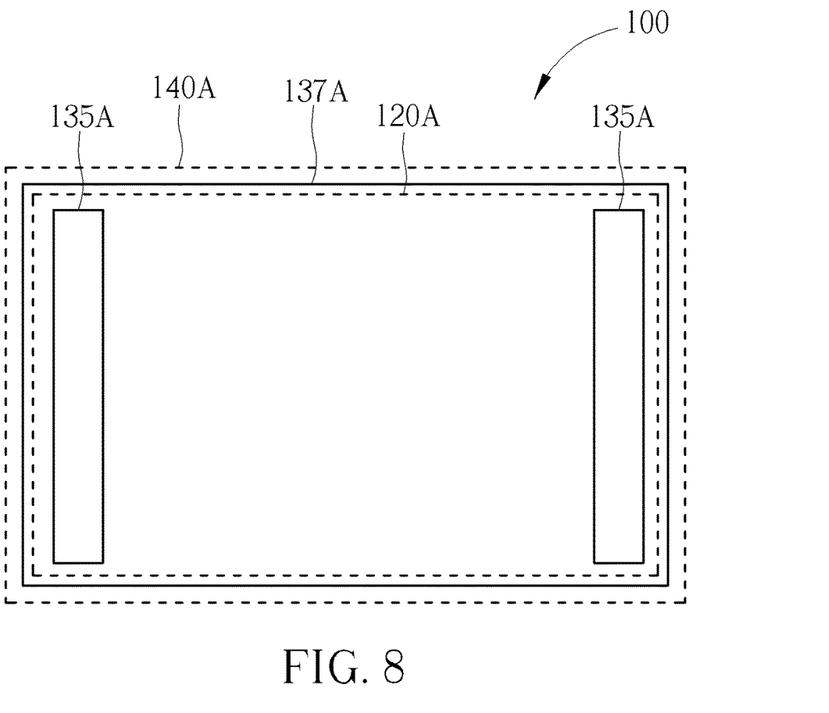
FIG. 8 illustrates a layout of the antenna device in FIG. 2.

FIG. 8 illustrates a layout of the antenna device 100 in FIG. 2. In FIG. 8, the antenna device 100 can include a display area 120A, an anti-reflection area 140A, antenna areas 135A and a sensing area 137A. The display layer 120 can be disposed in the display area 120A. The anti-reflection area 140 can be disposed in the anti-reflection area 140A. The plurality of antenna units 135 can be disposed in the antenna areas 135A. The plurality of sensing units 137 can be disposed in the sensing area 137A. For example, the anti-reflection area 140A can be larger than each of the sensing area 137A, the display area 120A and the antenna areas 135A.

Figure 9:
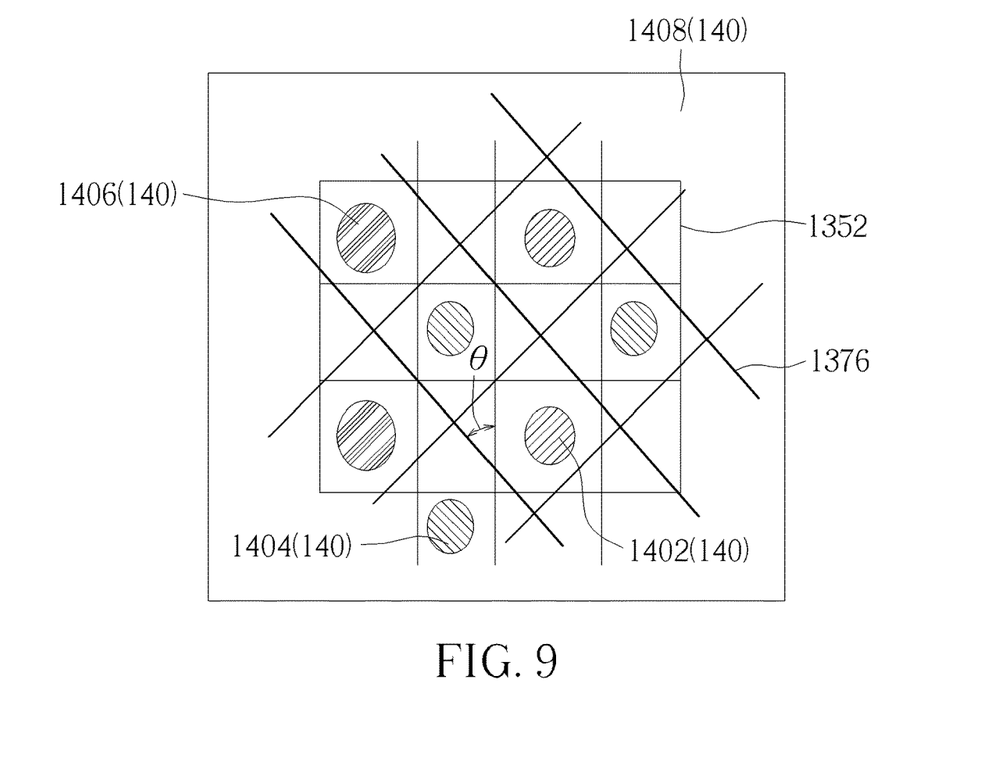
FIG. 9 illustrates a layout of the first mesh electrode of the antenna unit and the second mesh electrode of the sensing unit.

FIG. 9 illustrates a layout of the first mesh electrode 1352 of the antenna unit 135 and the second mesh electrode 1376 of the sensing unit 137. The first mesh electrode 1352 can be partially overlapped with the second mesh electrode 1376. However, in the area where the first mesh electrode 1352 and the second mesh electrode 1376 overlap, there should be holes, so that the light emitted from the display layer 120 can pass through the color filter unit 1402, the color filter unit 1404 and the color filter unit 1406 to be emitted outward.

As shown in FIG. 9, when the first mesh electrode 1352 and the second mesh electrode 1376 overlap, one of them can be rotated by an angle θ to reduce the interferences between first mesh electrode 1352 and the second mesh electrode 1376 caused by placing conductive portions in parallel.

The first mesh electrode 1352 of the antenna unit 135 can be thicker than the second mesh electrode 1376 of the sensing unit 137. Since the antenna unit 135 has to withstand greater voltage and current during operation, the first mesh electrode 1352 can be thicker to reduce the antenna impedance and improve the reliability of the antenna. Likewise, when the first mesh electrode 1352 is wider, the antenna impedance is reduced, and the reliability of the antenna is improved.

Figure 10:
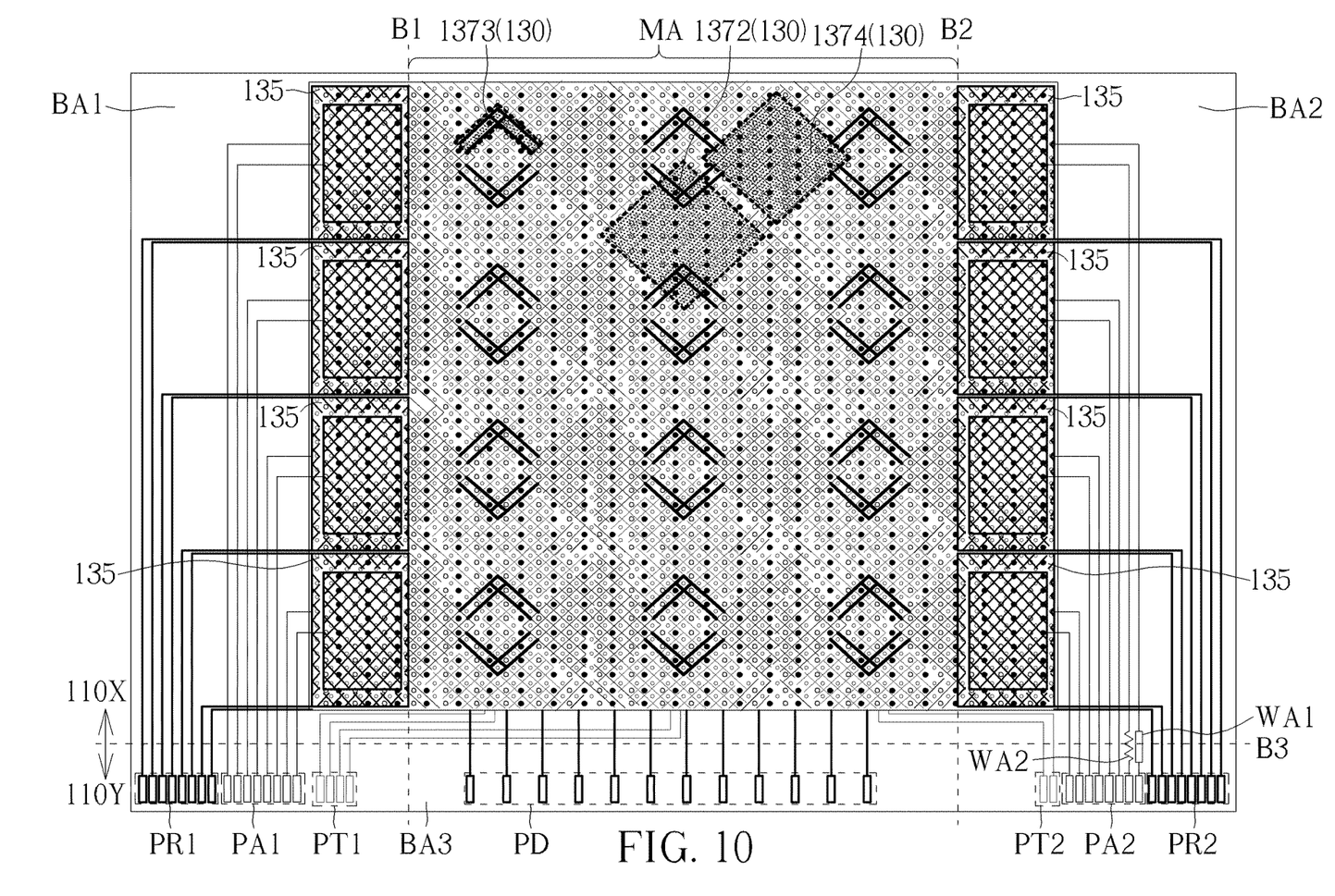
FIG. 10 illustrates wire bonding and bending axes of the display device in FIG. 2.
Figure 11:
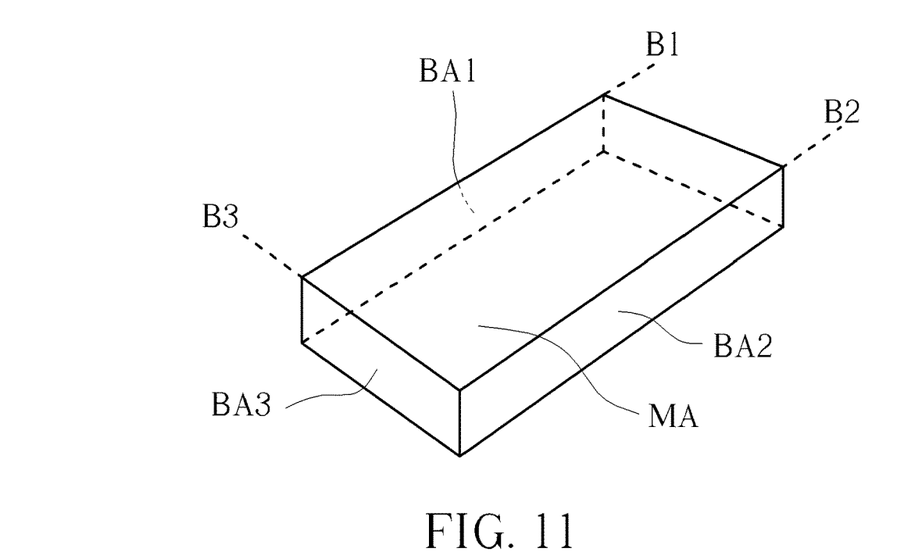
FIG. 11 illustrates a perspective view of the display device in FIG. 10 after the display device is bent.
Figure 12:
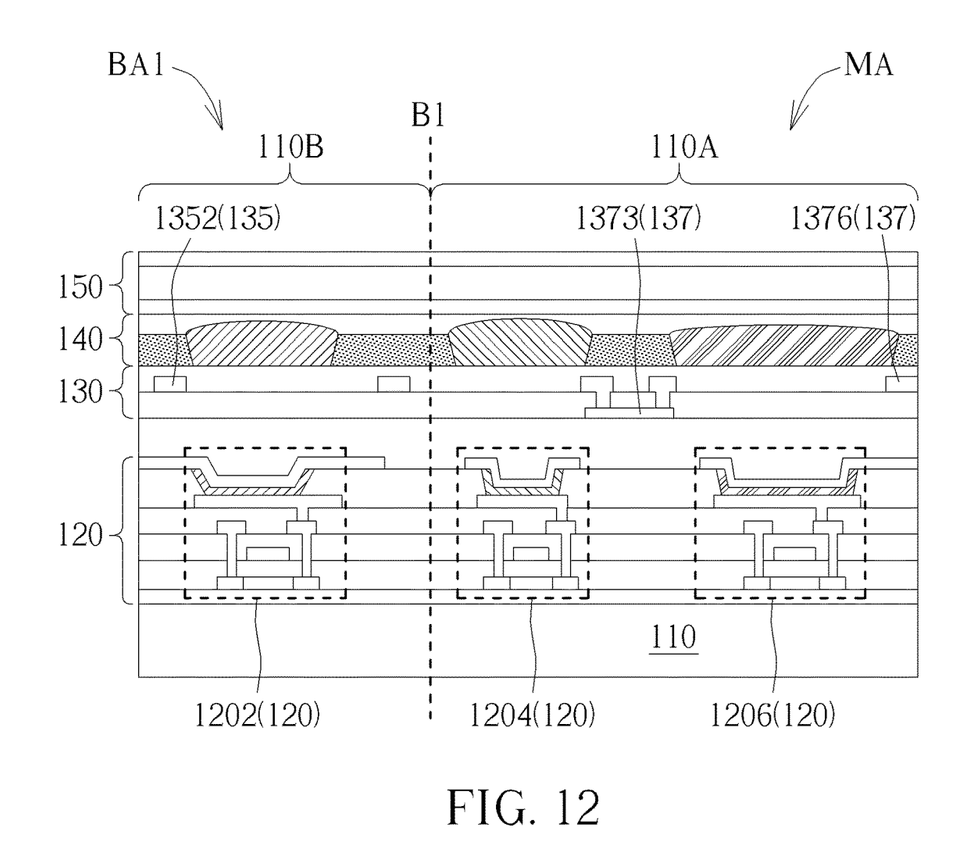
FIG. 12 illustrates a sectional view of a part of the display device in FIG. 10.

FIG. 10 illustrates wire bonding and bending axes of the display device 100 in FIG. 2. FIG. 11 illustrates a perspective view of the display device 100 in FIG. 10 after the display device 100 is bent. FIG. 12 illustrates a sectional view of a part of the display device 100 in FIG. 10. As shown in FIG. 10, FIG. 11 and FIG. 12, the display device 100 can be bent along a bending axis B1, a bending axis B2 and a bending axis B3 to form the three dimensional structure in FIG. 11. The three dimensional structure in FIG. 11 can be the structure of a smart phone or a tablet computer. In FIG. 10 and FIG. 11, after being bent, the display device 100 can have a main area MA, a bent area BA1, a bent area BA2 and a bent area BA3. In FIG. 11, the covered portion of the bent area BA1 is indicated with dotted lines. In FIG. 12, a part of the main area MA and the bent area A1 is illustrated to explain the structure.

In FIG. 10 to FIG. 12, the substrate 110 can include a first area 110A and a second area 110B. The second area 110B can be bent with respect to the first area 110A. The plurality of sensing units 137 of the functional layer 130 can be disposed on the first area 110A, and the antenna unit 135 can be disposed on the second area 110B.

In FIG. 10, in the plurality of sensing units 137 of the functional layer 130, a plurality of transmission units 1372 can be electrically connected to a set of bonding pads through signal lines, and a plurality of reception units 1374 can be electrically connected to another set of bonding pads through signal lines. The bonding pads corresponding to the transmission units 1372 can be disposed on a bonding area PT1 and a bonding area PT2. The bonding pads corresponding to the reception units 1374 can be disposed on a bonding area PR1 and a bonding area PR2. A plurality of antenna units 135 can be electrically connected to another set of bonding pads through signal lines, and the bonding pads corresponding to the antenna units 135 can be disposed on a bonding area PA1 and a bonding area PA2. For example, an antenna unit 135 can include a first portion and a second portion with different areas according to design requirements, and different signal lines can be electrically connected to the first portion and the second portion of the antenna unit 135 respectively. The display layer 120 can be electrically connected to another set of bonding pads through signal lines, and the bonding pads corresponding to the display layer 120 can be disposed on a bonding area PD. The layout in FIG. 10 is an example, and embodiments are not limited thereto. The locations of the bonding area PR1, the bonding area PA1 and the bonding area PT1 can be exchanged or adjusted according to requirements. The locations of the bonding area PR2, the bonding area PA2 and the bonding area PT2 can be exchanged or adjusted according to requirements.

In FIG. 10, the locations of the bonding area PR1, the bonding area PA1 and the bonding area PT1 can be corresponding to the bent area BA1. The locations of the bonding area PR2, the bonding area PA2 and the bonding area PT2 can be corresponding to the bent area BA2.

In FIG. 10, the substrate 110 can have a first area 110X and a boding area 110Y adjacent to the first area 110X. The bonding pads electrically connected to the antenna units 135, the sensing units 137 and the display layer 120 can be disposed on the bonding area 110Y. As shown in FIG. 10 to FIG. 12, the bonding area 110Y can be folded with respect to the first area 110X.

In order to avoid breakage of the signal lines during bending, as a signal line WA1 and a signal line WA2 in FIG. 10, one signal line can branch into multiple lines and/or have a wave shape to reduce the probability of breakage. One signal line can branch into multiple lines and also have a wave shape. For example, a signal line can have a predetermined width, and holes can be generated on the signal line to generate a branch structure. At least one of the signal lines connected to the antenna units 135, the signal lines connected to the sensing units 137 and the signal lines connected to the display layer 120 can be generated as mentioned above to reduce the probability of breakage.

In FIG. 10 to FIG. 12, a light emitting unit under the antenna unit 135 can be larger than a light emitting unit under the sensing unit 137, so that the size of the pixel under the antenna unit 135 is larger. The density of the light emitting units under the antenna unit 135 can be lower than the density of the light emitting units under the sensing units 137, so that the number of pixels per unit area under the antenna unit 135 is smaller. The light emitting units in the bent area BA1 and the bent area BA2 can be larger than the light emitting units in the main area MA, so that the sizes of the pixels in the bent area BA1 and the bent area BA2 can be larger. The density of the light emitting units in the bent area BA1 and the bent area BA2 can be smaller than that in the main area MA, so that the number of pixels per unit area in the bent area BA1 and the bent area BA2 can be smaller. Since the area where the bent area and the antenna units are located can be a secondary display area, the circuit complexity around the bent area and the antenna units can be reduced.

Figure 13:
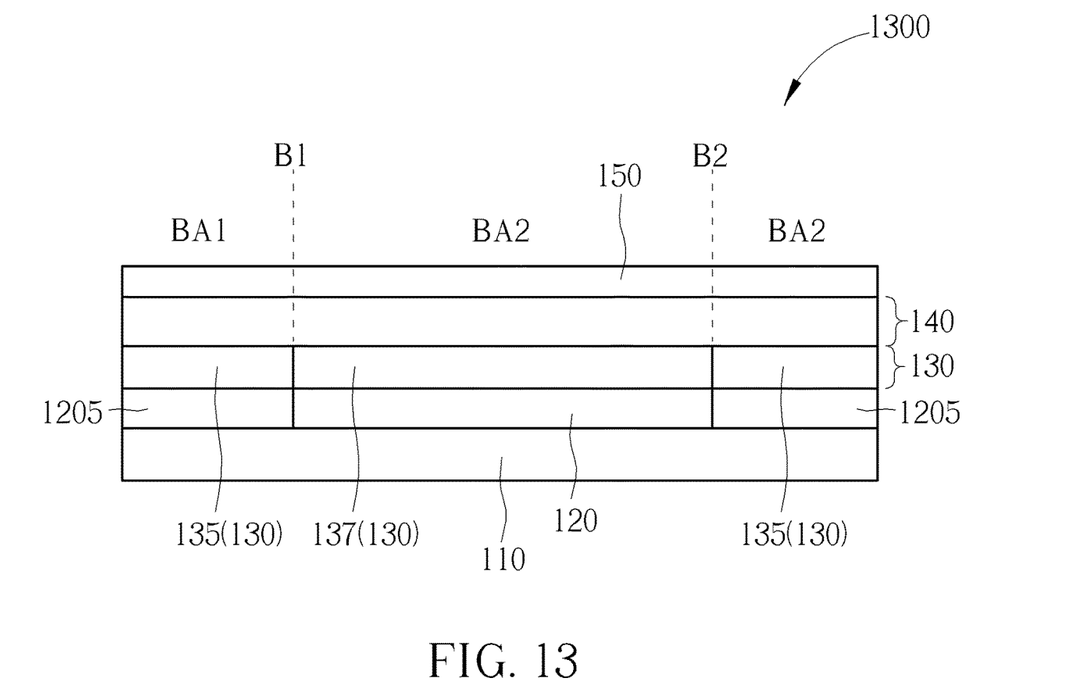
FIG. 13 illustrates a sectional view of a display device according to another embodiment.

FIG. 13 illustrates a sectional view of a display device 1300 according to another embodiment. The display device 1300 can be similar to the display device 100. However, in the display device 1300, the display layer 120 below the sending unit 137 can have display elements, but a layer 1205 below the antenna unit 135 can have no display element. For example, the layer 1205 below the antenna unit 135 can have none of the light emitting unit 1202, the light emitting unit 1204 and the light emitting unit 1206 mentioned above.

Figure 14:
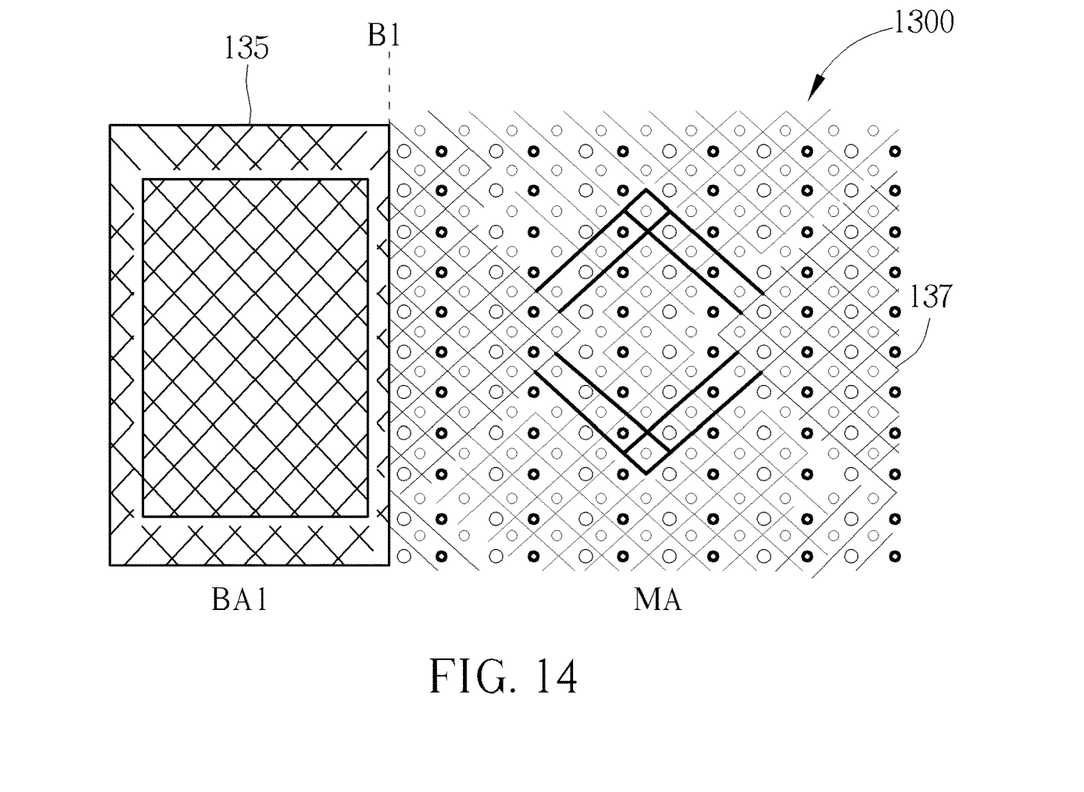
FIG. 14 illustrates a top view of a part of the display device in FIG. 13.

FIG. 14 illustrates a top view of a part of the display device 1300 in FIG. 13. In FIG. 13 and FIG. 14, in the area where the antenna unit 135 is located, light dots can not be displayed, so that content formed by light dots can not be displayed. In FIG. 13 and FIG. 14, the antenna unit 135 can be in the bent area BA1 and the bent area BA2 in FIG. 10, and a plurality of sensing units 137 can be in the main area MA in FIG. 10. In FIG. 14, the antenna unit 135 is in the bent area BA1 as an example.

Figure 15:
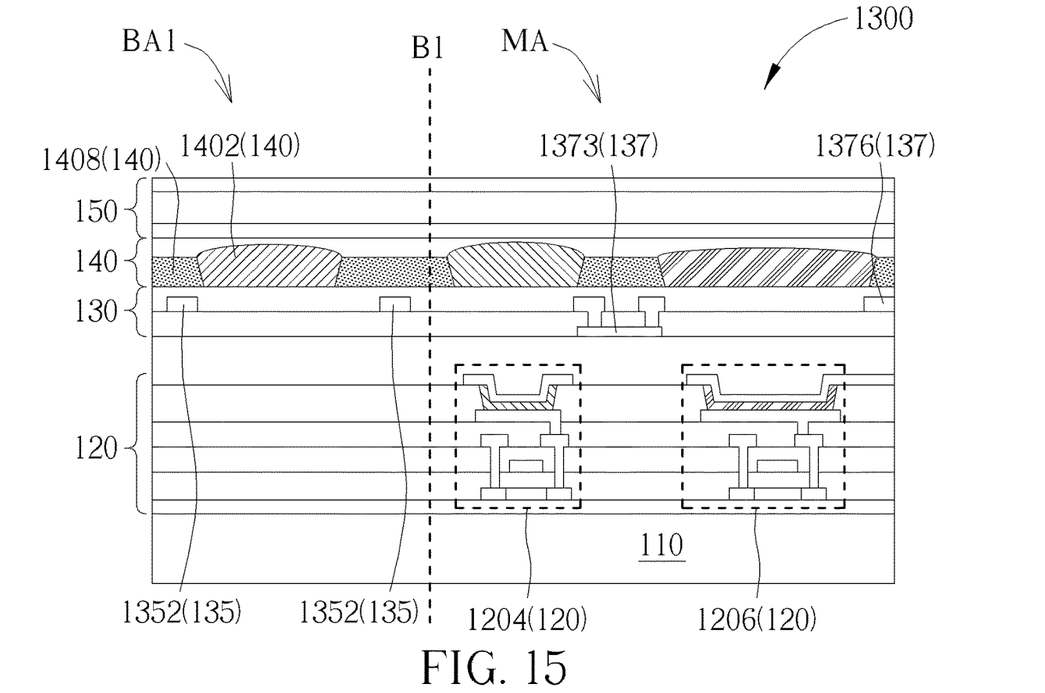
FIG. 15 illustrates a part of the display device in FIG. 13 according to an embodiment.

FIG. 15 illustrates a part of the display device 1300 in FIG. 13 according to an embodiment. FIG. 15 can be corresponding to FIG. 14. In FIG. 15, in the area where the antenna unit 135 is located (e.g. the bent area BA1), the anti-reflection layer 140 can still include a color filter unit (e.g. the color filter unit 1402). The light shielding layer 1408 (e.g. black matrix layer) can shield the ambient light reflected by the first mesh electrode 1352 of the antenna unit 135. There is no corresponding light emitting unit under the antenna unit, but there are corresponding light emitting units under the sensing unit.

Figure 16:
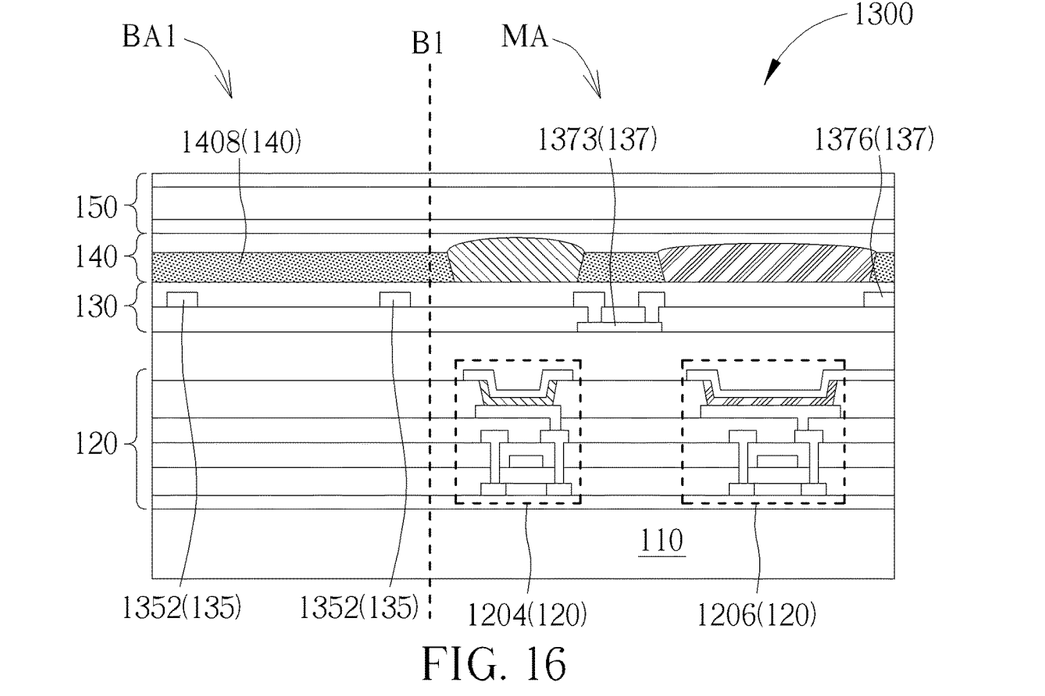
FIG. 16 illustrates a part of the display device in FIG. 13 according to another embodiment.

FIG. 16 illustrates a part of the display device 1300 in FIG. 13 according to another embodiment. FIG. 16 can be corresponding to FIG. 14. In FIG. 16, in the area where the antenna unit 135 is located (e.g. the bent area BA1), the anti-reflection layer 140 can include no color filter unit. The light shielding layer 1408 (e.g. black matrix layer) can shield the ambient light reflected by the first mesh electrode 1352 of the antenna unit 135.

In FIG. 13 to FIG. 16, the anti-reflection layer 140 can cover the antenna units 135 to reduce the light reflected by the metal electrodes of the antenna units 135, and the anti-reflection layer 140 can further extend to cover the display layer 120 to reduce the light reflected by the metal electrodes of the sensing units 135.

Figure 17:
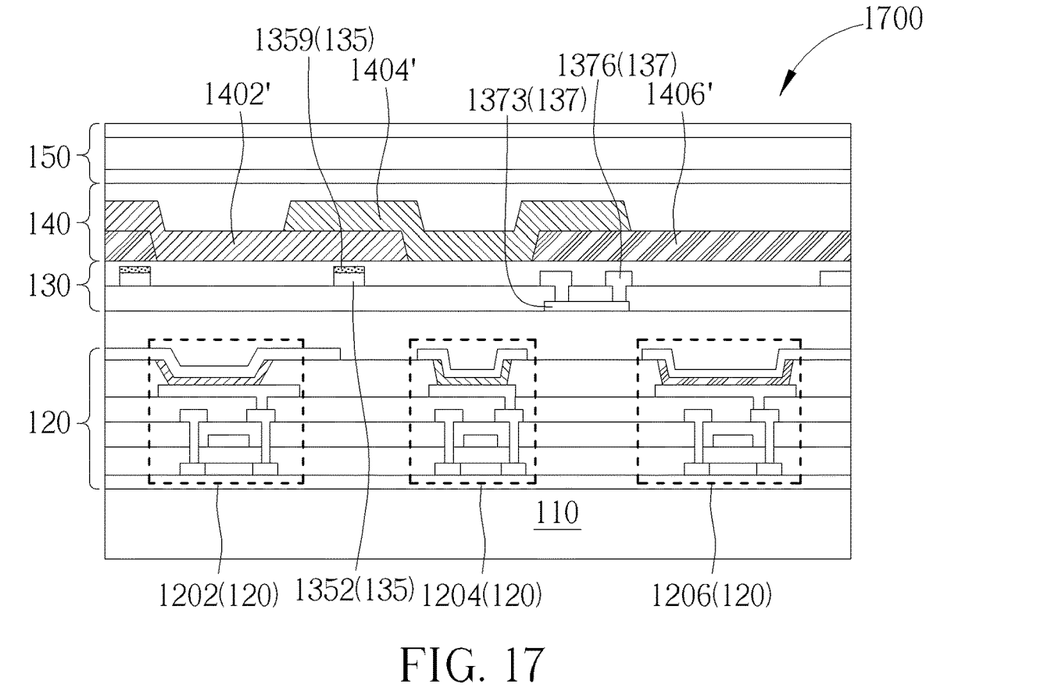
FIG. 17 illustrates a display device according to another embodiment.

FIG. 17 illustrates a display device 1700 according to another embodiment. The display device 1700 can be similar to the display device 100 in FIG. 3. However, the anti-reflection layer 140 of the display device 1700 can include no light shielding layer 1408 shown in FIG. 3. In the display device 1700, two color filter layers of different colors (e.g. two of a color filter layer 1402', a color filter layer 1404' and a color filter layer 1406') can be overlapped to shield ambient light reflected by the first mesh electrodes 1352 of the antenna units 135 and the second mesh electrodes 1376 of the sensing units 137. For example, the color filter layer 1402', the color filter layer 1404' and the color filter layer 1406' can be red, green and blue respectively. In addition, a black metal layer 1359 can be disposed above the first mesh electrode 1352 to reduce the light reflected by the first mesh electrode 1352.

Figure 18:
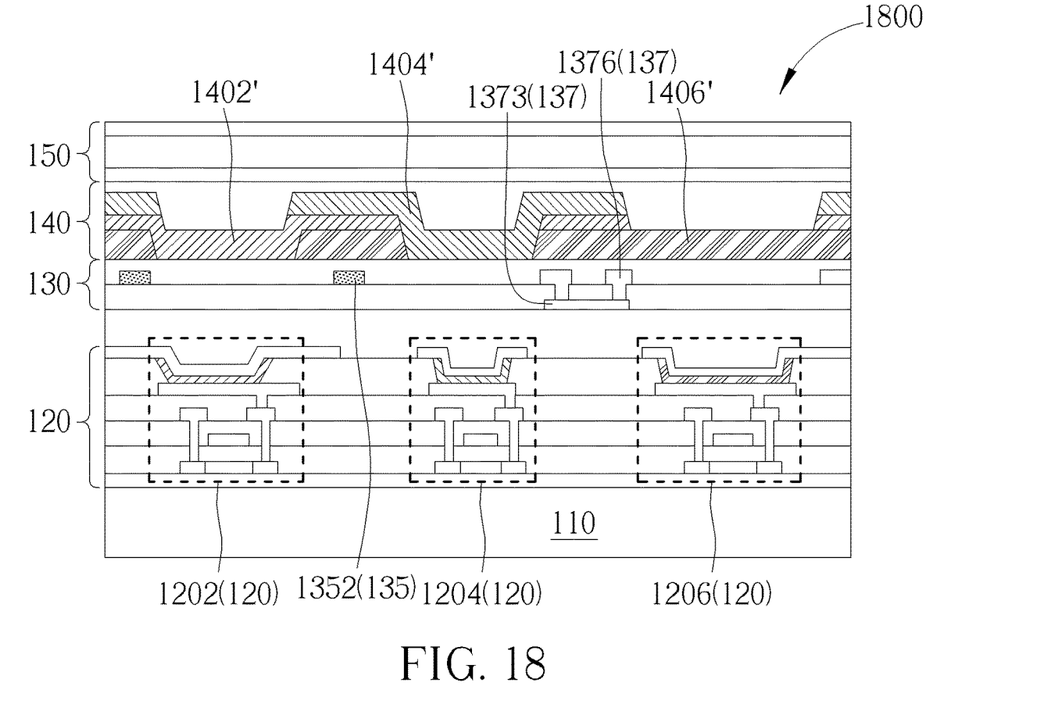
FIG. 18 illustrates a display device according to another embodiment.

FIG. 18 illustrates a display device 1800 according to another embodiment. The display device 1800 can be similar to the display device 1700. However, in the display device 1800, color filter layers of three different colors (e.g. all of the color filter layer 1402', the color filter layer 1404' and the color filter layer 1406') can be overlapped to shield ambient light reflected by electrodes. In addition, the first mesh electrodes 1352 of the antenna units 135 can be made of a black metal to reduce the reflected light.

Figure 19:
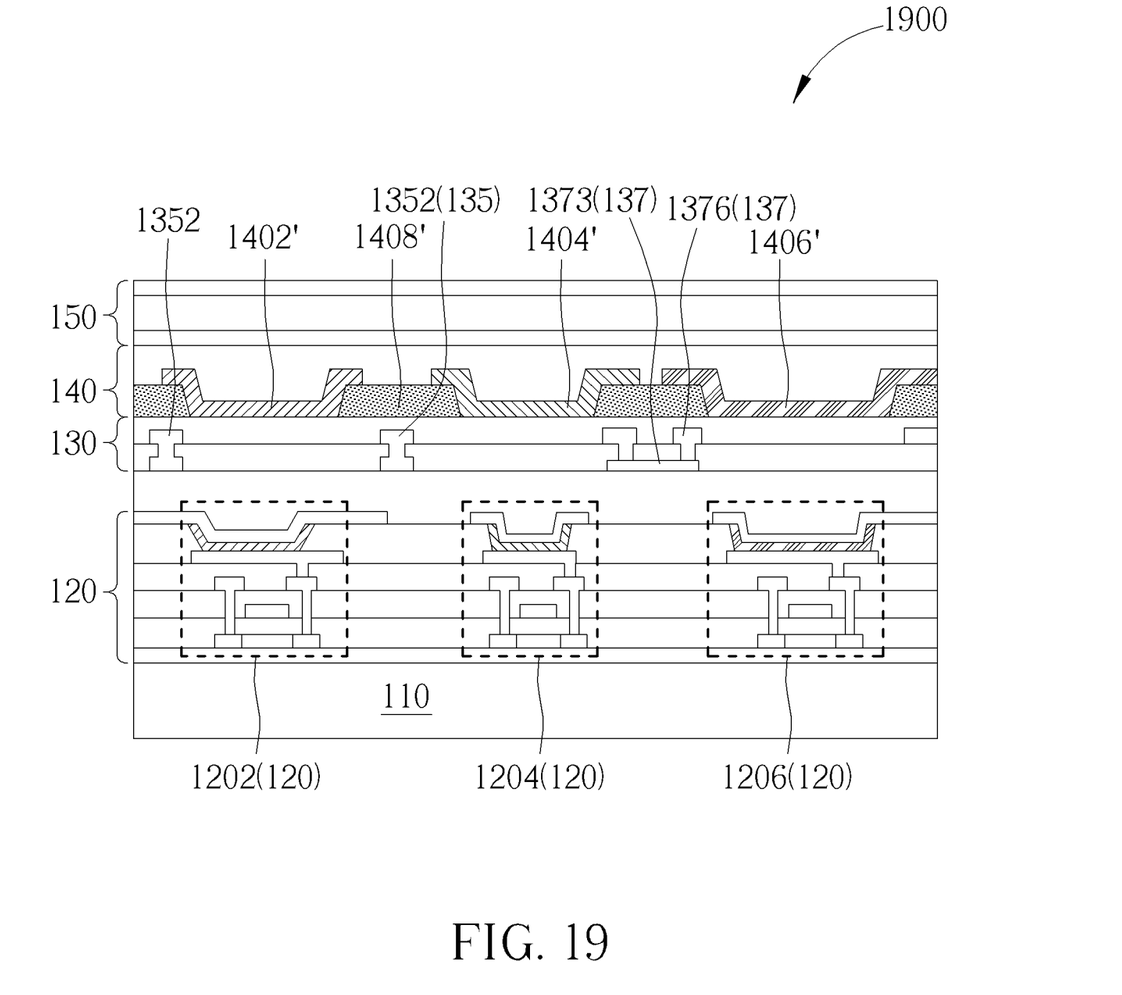
FIG. 19 illustrates a display device according to another embodiment.

FIG. 19 illustrates a display device 1900 according to another embodiment. In FIG. 19, the anti-reflection layer 140 can be generated with a yellow light process. A black metal can be etched, and then color filter layers can be disposed. Hence, the color filter layer 1402', the color filter layer 1404' and the color filter layer 1406' can be generated. In addition, as shown in FIG. 19, a thickness of the first mesh electrode 1352 of the antenna unit 135 can be increased by generating a via and connecting an upper conductive portion and a lower conductive portion, so the reliability is improved and the impedance is reduce.

The fabrication processes of the anti-reflection layer 140 and electrodes described in FIG. 17 to FIG. 19 can be used in combination according to requirements, and embodiments are not limited to the structures in FIG. 17, FIG. 18 and FIG. 19.

As mentioned above, each antenna unit 135 can include a mesh structure of the first mesh electrode 1352. However, if a proper antenna material is used, the antenna unit 135 can have no mesh structure. For example, the antenna unit 135 can be a slot antenna, a loop antenna or a panel antenna.

In summary, through the display device 100, the display device 1300, the display device 1700, the display device 1800 and the display device 1900, solutions are provided for disposing antennas in a display device. For stretchable, bendable and foldable display devices, such as flexible displays, the solutions provided by embodiments can be used to integrate the antenna into the display device. As a result, the performance of the antenna of transceiving signals is enhanced. Since unwanted reflected light is reduced, display performance is also improved.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device comprising:
a substrate;
a display layer disposed on the substrate;
a functional layer disposed over the substrate and comprising an antenna unit and a sensing unit, the antenna unit comprising a plurality of first openings and a first mesh electrode adjacent to the plurality of first openings, and the sensing unit comprising a plurality of second openings and a second mesh electrode adjacent to the plurality of second openings;
a first signal line electrically connected to the antenna unit;
a second signal line electrically connected to the sensing unit; and
an anti-reflection layer disposed over the sensing unit, and comprising a color filter layer comprising a plurality of color filter units and a light shielding layer adjacent to the plurality of color filter units, the first openings and the second openings being overlapped with the color filter units, and the first mesh electrode and the second mesh electrode being overlapped with the light shielding layer;
wherein the first mesh electrode and the second mesh electrode are disposed in different planes; and
wherein the first mesh electrode comprises a plurality of first wire segments, the second mesh electrode comprises a plurality of second wire segments, and a portion of the first mesh electrode and a corresponding portion of the second mesh electrode form an acute angle.

2. The display device according to claim 1, wherein the anti-reflection layer comprises a circular-polarizer layer.

3. The display device according to claim 1, wherein the plurality of color filter units are overlapped with the plurality of first openings.

4. The display device according to claim 3, wherein the first mesh electrode is overlapped with a first part of the light shielding layer, the second mesh electrode is overlapped with a second part of the light shielding layer, and a width of the first part is greater than a width of the second part.

5. The display device according to claim 1, wherein the antenna unit and the sensing unit are made of a same layer.

6. The display device according to claim 1, wherein the antenna unit and the sensing unit are made of different layers.

7. The display device according to claim 6, wherein the sensing unit is disposed between the anti-reflection layer and the antenna unit.

8. The display device according to claim 6, wherein the antenna unit is disposed between the anti-reflection layer and the sensing unit.

9. The display device according to claim 1, wherein the first mesh electrode is partially overlapped with the second mesh electrode.

10. The display device according to claim 1, wherein a thickness of the first mesh electrode is greater than a thickness of the second mesh electrode.

11. The display device according to claim 1, wherein a width of one of the plurality of first wire segments is greater than a width of one of the plurality of second wire segments.

12. The display device according to claim 1, wherein the anti-reflection layer further extends onto the display layer.

13. The display device according to claim 1, wherein the substrate comprises a first area and a second area bent with respect to the first area, the sensing unit is disposed on the first area, and the antenna unit is disposed on the second area.

14. The display device according to claim 1, further comprising a bonding pad electrically connected to the antenna unit, wherein the substrate comprises a first area and a bonding area adjacent to the first area, and the bonding pad is disposed in the bonding area.

15. The display device according to claim 14, wherein the bonding area is folded with respect to the first area.

16. The display device according to claim 1, wherein:
the antenna unit has a black metal layer formed above the first mesh electrode, and/or the antenna unit is formed with a black metal.

17. The display device according to claim 1, wherein the antenna unit and the sensing unit at least partially overlap in a top view of the display device.

18. The display device according to claim 1, wherein the sensing unit further comprises a bridge unit electrically connected to the second mesh electrode, a thickness of the first mesh electrode is greater than a thickness of the second mesh electrode, and the thickness of the second mesh electrode is greater than a thickness of the bridge unit.

* * * * *